United States Patent
Brundisini

(12) 
(10) Patent No.: US 6,378,838 B1
(45) Date of Patent: Apr. 30, 2002

(54) ELECTRONIC CONTROL DEVICE FOR A BISTABLE SOLENOID VALVE WITH AUTOMATIC LOW BATTERY PROTECTION

(75) Inventor: Andrea Brundisini, Bologna (IT)

(73) Assignee: Claber S.p.A. (IT)

( * ) Notice: Subject to any disclaimer, the term of this patent is extended or adjusted under 35 U.S.C. 154(b) by 0 days.

(21) Appl. No.: 09/453,308

(22) Filed: Dec. 2, 1999

(30) Foreign Application Priority Data

Dec. 14, 1998 (IT) .......................................... MI98A2673

(51) Int. Cl.[7] .............................................. F16K 31/02
(52) U.S. Cl. ................................... 251/129.04; 700/284
(58) Field of Search ...................... 251/129.04, 129.01; 239/DIG. 15, 67, 69, 70; 700/284

(56) References Cited

U.S. PATENT DOCUMENTS

| | | | |
|---|---|---|---|
| 3,599,867 A | * 8/1971 | Griswold et al. | 239/70 X |
| 3,723,827 A | * 3/1973 | Griswold et al. | 239/DIG. 15 |
| 4,108,419 A | * 8/1978 | Sturman et al. | 239/69 X |
| 4,114,647 A | * 9/1978 | Sturman et al. | 239/70 X |
| 4,256,133 A | * 3/1981 | Coward et al. | 239/64 X |
| 4,298,901 A | * 11/1981 | Weintraub et al. | 239/DIG. 15 |
| 4,423,484 A | * 12/1983 | Hamilton | 239/69 X |
| 4,646,224 A | * 2/1987 | Ransburg et al. | 239/70 X |
| 4,807,664 A | * 2/1989 | Wilson et al. | 239/69 X |
| 4,811,221 A | * 3/1989 | Sturman et al. | 239/69 X |
| 4,916,437 A | * 4/1990 | Gazzaz | 251/129.01 X |
| 5,158,447 A | * 10/1992 | Geary | 251/129.01 X |
| 5,661,349 A | 8/1997 | Luck | |

FOREIGN PATENT DOCUMENTS

| | | |
|---|---|---|
| FR | 2 612 276 | 9/1988 |
| WO | WO 93/24982 | 12/1993 |

* cited by examiner

*Primary Examiner*—Kevin Shaver
*Assistant Examiner*—John Bastianelli
(74) *Attorney, Agent, or Firm*—Akerman Senterfitt

(57) ABSTRACT

An electronic control device for a bistable solenoid valve, particularly for watering systems. The control device includes a power supply battery and a logic control unit, and provides low battery protection. A capacitor is set in parallel to the battery and a switch is operated by the logic control unit to effect, in a first operating position, charging of the capacitor and, in second and third operating positions, the application of control voltages having opposite signs from the capacitor to the solenoid valve for closing and opening the solenoid valve. The logic control unit is programmed in such a way that each request for opening of the solenoid valve brings about first the setting of the switch in the first operating position for charging the capacitor, then the switch is activated in the second operating position for closing the solenoid valve after a first preset time has elapsed following any previous closing control of the solenoid valve. The switch is then returned to the first operating position for a second charging of the capacitor and finally the switch is set in the third operating position to open the solenoid valve after a subsequent second preset time which is shorter than the first preset time.

12 Claims, 1 Drawing Sheet

ELECTRONIC CONTROL DEVICE FOR A BISTABLE SOLENOID VALVE WITH AUTOMATIC LOW BATTERY PROTECTION

BACKGROUND OF THE INVENTION

1. Field of the Invention

The present invention concerns an electronic control device for a bistable solenoid valve with automatic low battery protection, particularly for watering systems.

2. Description of Related Art

Watering systems for lawns, gardens, kitchen gardens and cultivated spaces are generally based on the use of solenoid valves that determine the delivery of water in the various sectors to be watered.

The control of the solenoid valves is entrusted to programmable electronic control devices having various degrees of complexity that can be connected with mains power or operate with battery power, in which case, for power saving reasons, valves with bistable type electric actuators are essential.

With battery operated devices, the battery runs down and it is then necessary to detect the low or exhausted battery condition and to operate the solenoid valves in order to lock them in a closing position. In this way, considering that bistable type solenoid valves require driving controls of short duration, it is possible to prevent the opening of the solenoid valve whilst the battery still has sufficient energy to control the opening of the solenoid valve, but insufficient energy to subsequently close the solenoid valve, with the consequence that watering would continue without interruption until the moment in which someone notices the problem.

For such reason battery-operated control devices are usually provided with electronic circuits capable of detecting the battery voltage dropping to a minimum value, below which no further activation of the solenoid valves being controlled will occur.

In this way, the detection circuit determines the locking of the system when in reality the battery still has sufficient energy for several additional activations.

In addition, the detection circuit has a cost of its own, that obviously affects the total cost of the control device.

An object of the present invention is to realize a battery operated electronic control device for a bistable type solenoid valve, particularly but not exclusively for watering systems, that does not require a detection circuit for detecting a low or exhausted battery condition.

SUMMARY OF THE INVENTION

According to a first aspect of the invention such object has been attained with an electronic control device for bistable solenoid valve, comprising: a power supply battery; a capacitor in parallel with the battery; a switch having first switching means interposed between the battery and the capacitor and second switching means interposed between the capacitor and the bistable solenoid valve, said switch having a first operating position (rest position), in which the capacitor is connected to the battery to receive charge therefrom and is disconnected from the solenoid valve and second and third operating positions in which the capacitor is disconnected from said battery and is connected to the solenoid valve to transfer control voltages having opposite signs from the capacitor to the solenoid valve for respectively causing closing and opening of the solenoid valve; and a programmed logic control unit which controls said switch so that at each request for the opening of the solenoid valve the switch operates, in succession, first switching from said first operating position to said second operating position for the closing of the solenoid valve after a first preset time has elapsed from a previous valve closing operation, then switching to said first operating position and finally switching to said third operating position for the opening of the solenoid valve after a second preset time from said second switching, said second preset time being shorter than said first preset time.

According to a second aspect of the invention, there is provided an electronic control device for a bistable solenoid valve, comprising: a power supply battery; a capacitor in parallel with the battery; and a programmed logic control unit which at each request for opening of the solenoid valve controls, in succession, a first charge of the capacitor from the battery for a first preset time, a first discharge of the capacitor for a closing operation of the solenoid valve, a second charge of the capacitor from the battery for a second preset time which is shorter than said first preset time, and a second discharge of the capacitor for an opening operation of the solenoid valve.

Thus, as will be better seen hereinafter, it is possible to have a guarantee that at a certain point of discharging of the battery, or even in case of removal of the battery, a residual energy remains in the capacitor that is capable of allowing the closing of the solenoid valve without any further possibility of opening it again.

BRIEF DESCRIPTION OF THE DRAWING

The characteristics of the present invention will be made evident by the following detailed description of an embodiment thereof that is illustrated as a non limiting example in the enclosed drawings, in which.

DETAILED DESCRIPTION OF THE INVENTION

Figure 1:
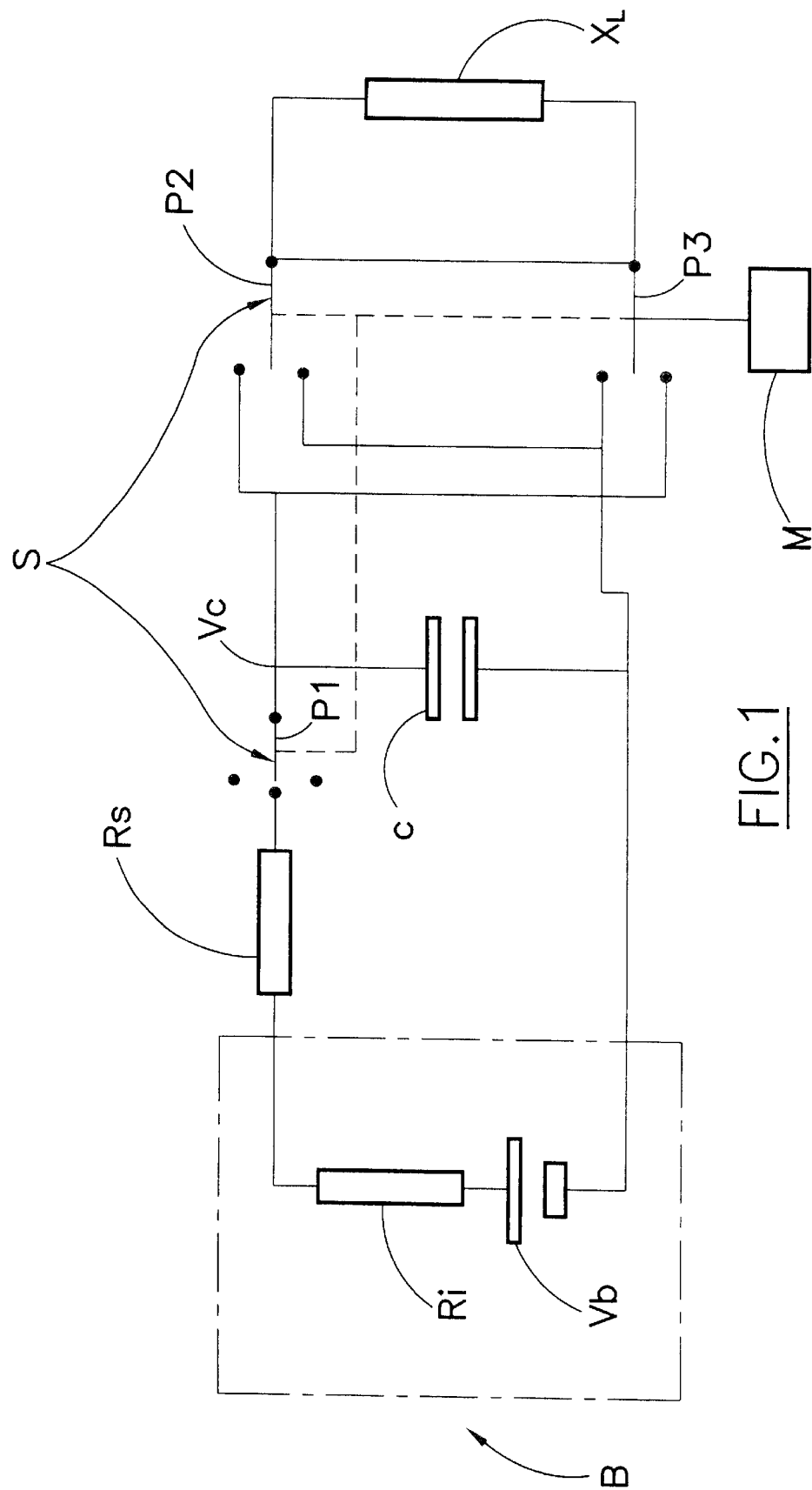
FIG. 1 shows the equivalent electric circuit of the part of control device that provides for low battery protection.

With reference to the drawing, a battery considered to be made of a voltage generator Vb and having an equivalent internal resistance Ri is indicated by B as a whole.

A series resistance Rs is set in series to battery B and a capacitor C is set in parallel to the series circuit consisting of Vb, Ri and Rs at the ends of which capacitor a voltage Vc is thus present.

A switch S with three poles P1, P2 and P3 and three operating positions ("ON" upward in FIG. 1, "CHARGE" in the center, "OFF" downward) controlled by a microprocessor logic control unit M charges the capacitor C at the voltage Vc when the pole P1 of the switch is in the "CHARGE" position. The switch S is also used to subsequently apply the voltage Vc thus obtained, with opposite signs according to whether the poles P2 and P3 of the switch are in the position "ON" or "OFF," to a load representative of the solenoid valve (or solenoid valves) being controlled, or better of the bistable solenoid that controls the opening and closing for starting and, respectively, stopping a watering system.

The operating principle of the circuit herein described, and therefore of the low or exhausted battery protection that it represents, is the following.

Consider that at the moment of release of the switch S after starting (position "ON") or stopping (position "OFF") the solenoid valve, i.e. after a discharge of the capacitor C on the charge $X_L$ (for example for a time ts=50 msec), the capacitor C is at a voltage Vin, which is almost identical in the two cases.

Subsequently, that is with the switch S in the rest position of FIG. 1, the charge voltage of the capacitor varies according to the following ratio:

$$Vc(t)=Vin+(Vb-Vin)*(1-e^{-[t/Ri+Rs)*C]})$$

Therefore, after 2 seconds the voltage Vc at the ends is:

$$Vc(2\ sec)=Vin+(Vb-Vin)*(1-e^{-2/(Ri+Rs)*C]})$$

whereas after 8 seconds the voltage Vc becomes:

$$Vc(8\ sec)=Vin+(Vb-Vin)*(1-e^{-8/(Ri+Rs)*C]})$$

The difference between the two voltages Vc(8 sec) and Vc(2 sec) is the following:

$$\Delta Vc=[Vc(8\ sec)-Vc(2\ sec)]=Vin+(Vb-Vin)*(1-e^{-8/(Ri+Rs)*C]})\\-Vin-(Vb-Vin)*(1-e^{-2/(Ri+Rs)*C]})$$

that is $$\Delta Vc=(Vb-Vin)*(1-e^{-8/(Ri+Rs)*C]}-1+e^{-2/(Ri+Rs)*C]})=(Vb-Vin)*\\(e^{-2/(Ri+Rs)*C]}-e^{-8/(Ri-Rs)*C]})$$

that is yet $$\Delta Vc=(Vb-Vin)*[e^{-2/(Ri-Rs)*C]}-e^{-8/(Ri-Rs)*C]}]$$

If we consider for example the following values for a charged battery and an exhausted battery with Rs=68 Ohm, C=4700 µF and $X_L=R_L=5$ Ohm (having approximated the charge $X_L$ with a simple resistance, since the effect of the inductor of the same charge is negligible):
Charged battery: Vb=9.5V
Ri=10 Ohm $$Vin=Vb*e^{-[ts/RL*C]}=9.5*e^{-[0.05/(5*0.0047)]}=1.13V$$

Exhausted battery: Vb=7.0V
Ri=100 Ohm $$Vin=Vb*e^{-[ts/RL*C]}=7.0*e^{-[0.05/(5*0.0047)]}=0.84V$$

by substituting we obtain:

$$\Delta Vc\ (charged\ battery)=(9.5-1.13)*(e^{-2/[(10+68)*0.0047]}-e^{-8/[(10+68)*0.0047]})=0.036\ V$$

$$\Delta Vc\ (exhausted\ battery)=(7.0-0.84)*(e^{-2/[(100+68)*0.0047]}-e^{-8/[(100+68)*0.0047]})=0.490\ V$$

As can be observed, the difference between the voltage Vc after 2 seconds and that after 8 seconds increases when the battery charge decreases, by virtue of the increase of the equivalent internal resistance Ri of the battery.

By taking advantage of this principle, low or exhausted battery protection takes place, according to the invention, in the following way:

Each time that it is necessary to open the valve, the microprocessor M first controls the closing operation (switch S in "OFF" position), insuring that any possible previous closing operation has taken place more than 8 seconds previously. Otherwise, it allows 8 seconds to elapse since the last closing operation (switch S in "CHARGE" position).

In this way there is a guarantee that the capacitor C has reached the charge voltage Vc (8 sec) before controlling the closing of the solenoid valve.

After having sent the command for the closing of the valve, the microprocessor waits 2 seconds so as to guarantee the voltage value Vc (2 sec) on the capacitor C (switch S in "CHARGE" position) and at that point it sends the control for the opening of the valve (switch S in "ON" position).

Substantially, the microprocessor operates in such a way that the charge voltage (Vc (8 sec)) of the capacitor C at the moment of closing the valve is always higher than the charge voltage ((Vc (2 sec)) present at the moment of opening the valve.

As already said, the difference between the two voltages ($\Delta Vc=Vc$ (8 sec)–Vc (2 sec)) is higher as the battery becomes more discharged.

There is therefore the guarantee that at a certain point of discharging the battery the capacitor C contains a residual energy capable of allowing the closing of the valve without it being possible to open it again.

At the same time the valve continues to be opened and closed until the battery runs down and not until any detection circuit decides, as in the control devices according to the prior art.

In addition, in case of a request for the opening of the valve during the stage of replacement of the battery or, in any case, its removal for any reason, the present invention prevents the residual power present in the capacitor C being used to open the valve without any energy being available for closing the valve, due to disconnection of the battery.

Besides it is necessary to keep in mind that after the last possible closing of the valve enough power must be present in the battery so as to guarantee the operation of the control microprocessor. Otherwise what could in fact happen is that, while the valve is open, the microprocessor does not receive enough power from the battery to allow it to control the closing of the valve. This condition is guaranteed by choosing a proper type of microprocessor that is capable of working at voltages that are sufficiently lower than the minimum voltages required for activation of a bistable solenoid for a solenoid valve.

In addition it should also be considered that, having substantially removed any limit to the minimum value of battery voltage required for the activation of the solenoid valve and having thus increased the number of possible activations of the solenoid valve, it is possible, without losing performance compared with a traditional central control unit, to unbalance the power supply circuit of the solenoid valve by adding a series resistance only during the stage of the valve opening, so that less power gets to the solenoid of the solenoid valve in the opening stage than in the closing stage. In case the pole P2 of the switch S is of an electronic transistor type, that would be possible by using transistors with values of Vcesat (collector-emitter in conditions of saturation voltage) for the opening control circuit that are higher than the Vcesat values of the transistors of the closing control circuit.

What is claimed is:
1. An electronic control device for a bistable solenoid valve, comprising:
a power supply battery;
a capacitor in parallel with the battery;
a switch having first switching means interposed between the battery and the capacitor and second switching means interposed between the capacitor and the bistable solenoid valve, said switch having a first operating position (rest position), in which the capacitor is connected to the battery to receive charge therefrom and is disconnected from the solenoid valve and second and third operating positions in which the capacitor is disconnected from said battery and is connected to the solenoid valve to transfer control voltages having opposite signs from the capacitor to the solenoid valve for respectively causing closing and opening of the solenoid valve; and a programmed logic control unit which controls said switch so that at each request for the opening of the solenoid valve the switch operates, in succession, first switching from said first operating position to said second operating position for the closing of the solenoid valve after a first preset time has elapsed from a previous valve closing operation, then switching to said first operating position and finally switching to said third operating position for the opening of the solenoid valve after a second preset time from said second switching, said second preset time being shorter than said first preset time.

2. The device according to claim 1, wherein said first preset time is equal to 8 seconds.

3. The device according to claim 1, wherein said second preset time is equal to 2 seconds.

4. The device according to claim 1, wherein said logic control unit comprises a microprocessor that is capable of operating with a supply voltage lower than the minimum voltage required for the activation of the solenoid valve.

5. The device according to claim 1, further comprising means for reducing the control voltage applied to the solenoid valve for opening the solenoid valve with respect to the voltage made available by the capacitor.

6. The device according to claim 5, wherein said means for reducing the control voltage consist of a series resistance interposed between the battery and the capacitor.

7. An electronic control device for a bistable solenoid valve, comprising:

a power supply battery;

a capacitor in parallel with the battery; and a programmed logic control unit which at each request for opening of the solenoid valve controls, in succession, a first charge of the capacitor from the battery for a first preset time, a first discharge of the capacitor for a closing operation of the solenoid valve, a second charge of the capacitor from the battery for a second preset time which is shorter than said first preset time, and a second discharge of the capacitor for an opening operation of the solenoid valve.

8. The device of claim 7, wherein said first preset time is equal to 8 seconds.

9. The device of claim 7, wherein said second preset time is equal to 2 seconds.

10. The device of claim 7, wherein said logic control unit comprises a microprocessor that is capable of operating with a supply voltage that is lower than the minimum voltage required for activation of the solenoid valve.

11. The device of claim 7, further comprising means for reducing the control voltage applied to the solenoid valve for opening the solenoid valve with respect to the voltage supplied by the capacitor.

12. The device of claim 7, wherein said means for reducing the control voltage consist of a series resistance interposed between the battery and the capacitor.

* * * * *